No. 685,002. Patented Oct. 22, 1901.
I. S. McGIEHAN.
PNEUMATIC TIRE FOR VEHICLES.
(Application filed Apr. 13, 1901.)
(No Model.) 2 Sheets—Sheet 1.

No. 685,002. Patented Oct. 22, 1901.
I. S. McGIEHAN.
PNEUMATIC TIRE FOR VEHICLES.
(Application filed Apr. 13, 1901.)
(No Model.) 2 Sheets—Sheet 2.
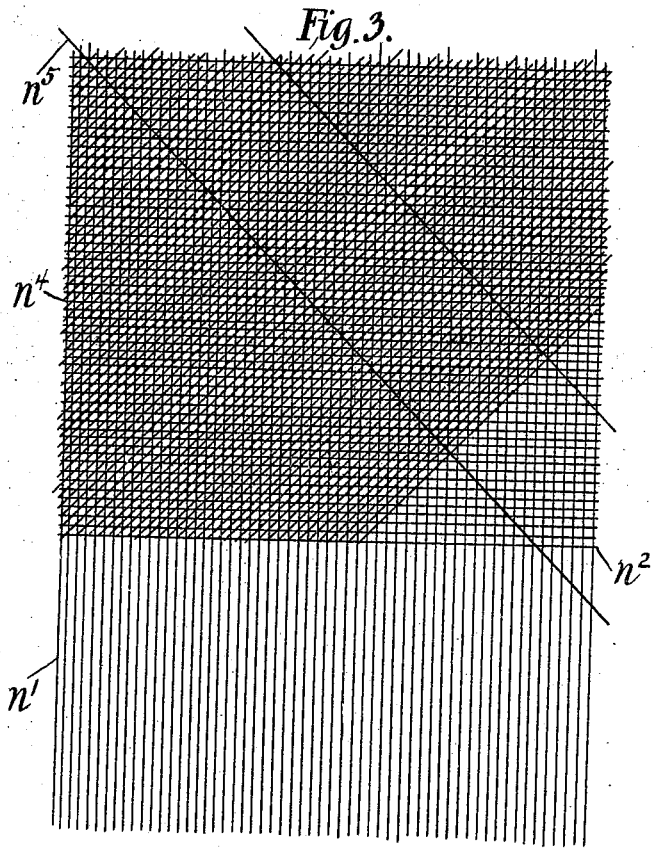
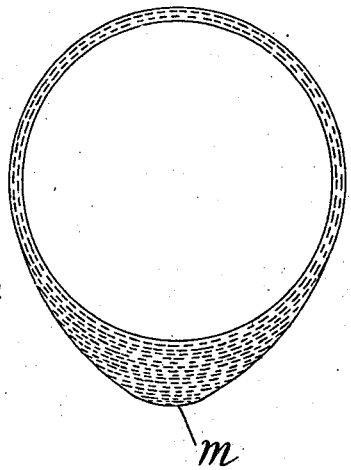
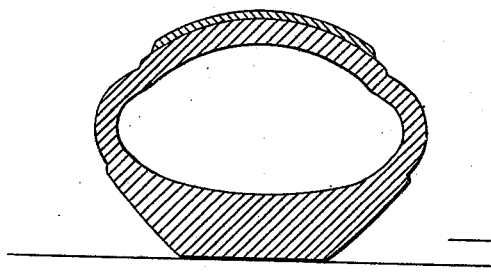
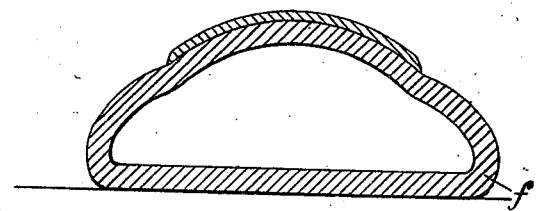
Witnesses
Edgworth Greene
H. L. Murray.
Isaac S. McGiehan
Inventor
by George H. Huntington
Attorney

UNITED STATES PATENT OFFICE.

ISAAC S. McGIEHAN, OF NEW YORK, N. Y.

PNEUMATIC TIRE FOR VEHICLES.

SPECIFICATION forming part of Letters Patent No. 685,002, dated October 22, 1901.

Application filed April 13, 1901. Serial No. 55,601. (No model.)

*To all whom it may concern:*

Be it known that I, ISAAC S. MCGIEHAN, a citizen of the United States, and a resident of New York city, in the county and State of New York, have invented new and useful Improvements in Pneumatic Tires for Vehicles, of which the following is a specification.

This invention relates to the construction of rubber tires for vehicles, particularly that class known as "pneumatic tires." The principal objects sought are to construct the tire so that the rubber and fabric of which it is made are thoroughly amalgamated and become so united as to form a homogeneous coöperating substance, whereby the rubber will be utilized to its best advantage with the least possibility of destruction, at the same time making the tire practically puncture-proof.

It also has for its object to provide a tread-surface which is the least disturbing to the air which inflates the tire and which increases the life of the tire; also, to construct and use a fabric in the manufacture of pneumatic tires that will prevent them from stretching transversely across the tire, as will be hereinafter explained.

Figure 1:
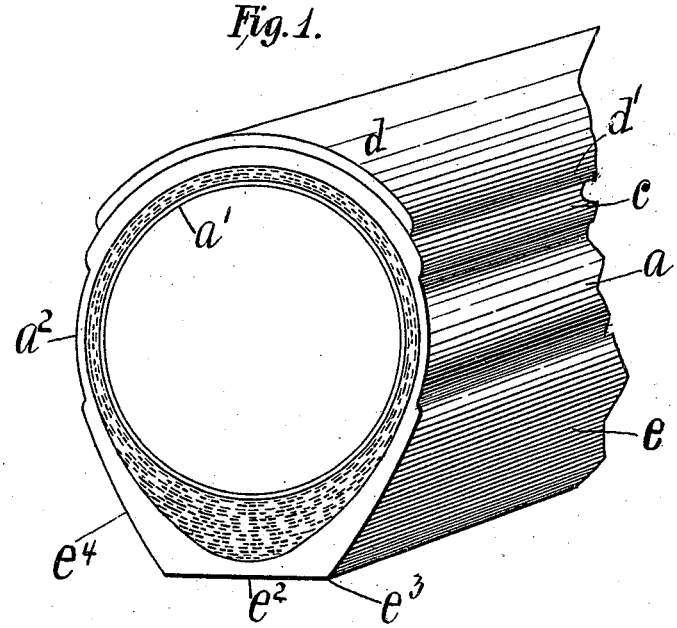
Figure 2:
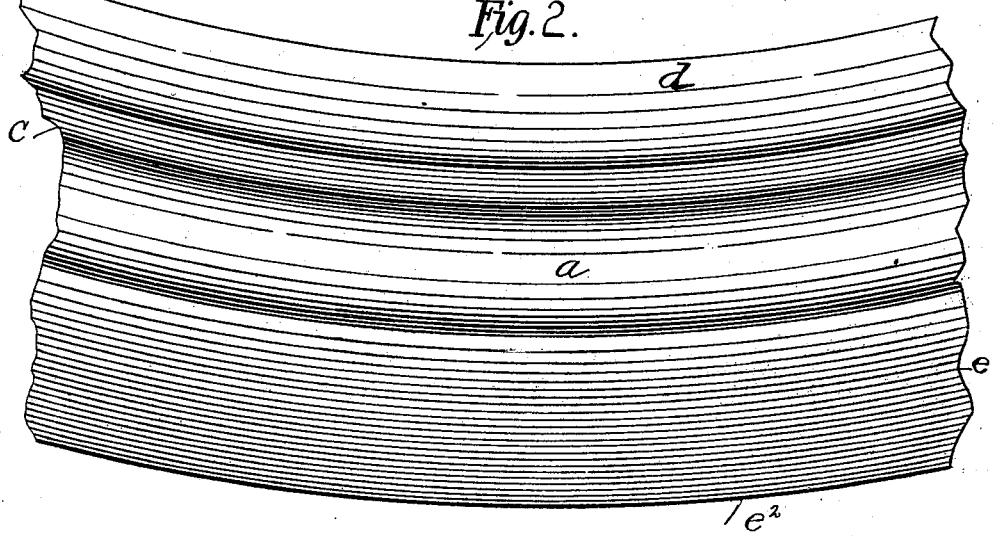

In the accompanying drawings, which form a part of this specification, my invention is fully illustrated, with similar letters of reference to indicate corresponding parts, as follows:

Figure 1 represents a transverse section in perspective showing an end view which illustrates the construction of the tire. Fig. 2 illustrates a side elevation of the tire, showing the beveled tread portion, also the reinforced surface upon which the rim rests. Fig. 3 is an illustration of the open-mesh fabric which forms the body or foundation and upon which the rubber is calendered before being formed in the tire. Two or more layers of this fabric, sometimes several, according to the intended thickness of the tire, are (being first coated with rubber) pressed together before being vulcanized. The rubber, therefore, is forced through the meshes and unites with the rubber on the opposite side, thus forming one solid homogeneous thickness of rubber with layers of the interwoven fabric as a foundation. Fig. 4 represents a cross-section of the tire as it will appear before the outer surface of the fabric is covered with rubber, showing its reinforced cone-shaped tread. Fig. 5 represents my improved tire under a heavy load, and Fig. 6 represents the ordinary tire under a similar load.

Referring to Fig. 3, one of the principal features of my improved tire is the adoption of a fabric which is constructed of spun cotton or other material so woven with three strands as to prevent any lateral stretch of the fabric after it is cut in what may be termed "bias" strips of the usual form.

As shown in Fig. 3, the fabric is first woven in the usual way with the longitudinal threads $n'$ and the transverse threads $n^2$. In this respect the fabric differs but slightly from that now in use, except that its mesh is very open, so that when being calendered the rubber will be forced through the mesh.

In order to prevent the tire after it is finished and when being inflated from stretching transversely and increasing its tubular diameter with the increased internal pressure of air, I insert in the fabric when being woven a third thread, which may be termed a "stay-thread" $n^4$, Fig. 3. Thus when the fabric is cut diagonally, so as to produce the bias strip which is woven in the tire, it is cut at right angles to the stay-thread $n^4$, and as this thread will extend directly at right angles across the bias strip $n^5$ it will be impossible for a tire formed with this fabric to increase its tubular diameter. The object of this construction and formation of fabric is to enable the tire to carry a greater pressure of air, which is supported by the stay-threads of the fabric without causing any additional strain or stretch of the rubber; also, to divert the air to a cylindrical pressure within the tire rather than the spreading destructive pressure usually accommodated by the transverse stretch of the tire.

In forming the tire, before the outer coating of rubber is put on the layers of fabric are increased on the lower side by adding additional narrowing strips until the fabric forms a cone or shield thickest in its center, as at $m$, Fig. 4, so that any stone or sharp projection in the road which might pierce the tread $e^2$, Fig. 1, would be deflected out through the beveled side $e$ of the tread without passing through the fabric or creating a puncture.

Referring to Fig. 1, the flat tread $e^2$ is for the purpose of giving a greater spread of pressure against the column of air within the tire, so as to prevent the destructive sharp bend which occurs to the sides of the tire when the vehicle is carrying an unusually heavy load; also, to preserve a uniform tread-surface and prevent the tire from spreading out on the ground laterally, and thereby providing additional surface liable to puncture. This result is shown in Figs. 5 and 6, Fig. 5 representing my improved tire under a heavy load, and Fig. 6 representing the ordinary tire with a similar load. Of course to support my improved flat tread the sides of the tire must be gradually thickened until they reach the intersecting-line $e^3$, Fig. 1, thus forming the bevel sides $e$, which, as shown by the lines $e^4$, are usually curved slightly outward to provide the increased thickness above referred to.

It will be seen by Fig. 5 that the sharp bending of the sides $f$, Fig. 6, are avoided with my improved tread, and also that the very broad surface (shown in Fig. 6) spread upon the ground to receive punctures is avoided. The column of air in my improved tire assumes an elliptical form in transverse section, while that in the ordinary tire assumes a semicircular form with a very broad flat surface on the ground, the result of which is many punctures and porous and cracked sides to the tire.

Another important feature of my invention is the reinforced rim-surface, as shown at $c$, Figs. 1 and 2, which consists of an extra sheet of rubber vulcanized on the inner circle of the tire against which the rim rests.

Having thus described my invention, what I claim, and desire to secure by Letters Patent of the United States, is—

1. In the manufacture of pneumatic tires the introduction of a fabric having a third or stay thread interwoven diagonal to the selvage edges of said fabric, so that when the fabric is cut on the bias the diagonally-woven thread will be at right angles to the line of cut, whereby lateral tubular strain of the tire by distention will be prevented.

2. A fabric to be used in the construction of pneumatic tires having the warp and weft threads woven at right angles, and a third or stay thread interwoven with and diagonal to the warp and weft threads, so that when the fabric is cut on the bias the diagonal or stay thread will be at right angles to the line of cut, whereby lateral strain is prevented.

3. In a pneumatic tire a tube constructed of a rubber-coated fabric having a third or stay thread interwoven therein diagonally to the warp and weft, being so placed that when said fabric is cut on the bias said diagonal or stay thread will be at right angles to the line of cut, the outer periphery of said tube being provided with a cone-shaped or thickened portion to form the tread of the tire.

4. A rubber tire having its tread-surface and its rim-surface outwardly increased in thickness, and the side portions between the thickened portions convexedly inset, whereby the bend, under pressure, will be at opposite points approximately midway between the said thickened portions.

5. A rubber tire having a flat tread-surface with flaring sides, said sides and the rim-surface being increased in thickness to form an inset convex annular panel between the thickened portions, a series of concentrically-arranged fabric strips embedded within the tread-surface and forming a shield, cone-shaped in cross-section, whereby articles liable to puncture the tire will be deflected out through the flaring sides.

6. A pneumatic tire comprising a tubular body portion formed of a rubber-coated fabric, having third or stay threads interwoven with the warp and weft threads in such manner that the stay-threads will be diagonal to the selvage edges of the fabric, and a covering of rubber vulcanized to said body portion providing a flat tread with flaring sides.

7. A pneumatic tire provided with reinforce fabric strips on its tread side, said strips composed of a fabric having stay-threads interwoven diagonally to the selvage edges, in combination with a rubber covering having a flat tread and flaring sides extending from said flat tread to the sides of the tire, substantially as described.

8. A rubber tire comprising a tube of rubber-coated fabric, a series of gradually-narrowing reinforcing-strips, concentrically arranged around the outer periphery of the tube, said strips forming a shield, cone-shaped in cross-section, and an outer body of rubber, said body having a flat tread with flaring sides, said sides and the rim-surface of the tire being thickened or reinforced to form an inset convex annular panel.

9. A rubber tire comprising a tube of rubber-coated fabric, a series of gradually-narrowing reinforcing-strips, concentrically arranged around the outer periphery of the tube, said strips forming a shield cone-shaped in cross-section, and an outer body of rubber, said body having a flat tread with flaring sides outwardly thickened, outwardly-thickened rim-surface and convexedly-inset sides, as and for the purpose set forth.

In testimony that I claim the foregoing specification I have hereunto set my hand this 13th day of April, 1901.

ISAAC S. McGIEHAN.

In presence of—
W. L. MURRAY,
JAMES A. SCOTT.